United States Patent [19]
Johnson et al.

[11] 4,064,692
[45] Dec. 27, 1977

[54] VARIABLE CYCLE GAS TURBINE ENGINES

[75] Inventors: James Edward Johnson, Hamilton; Tom Foster; Roy Duncan Allan, both of Cincinnati, all of Ohio

[73] Assignee: The United States of America as represented by the Administrator of the National Aeronautics and Space Administration, Washington, D.C.

[21] Appl. No.: 583,056

[22] Filed: June 2, 1975

[51] Int. Cl.$^2$ .................. F02K 3/06; F02K 1/12
[52] U.S. Cl. .................. 60/261; 60/262; 60/271
[58] Field of Search .............. 60/224, 226 R, 262, 60/271, 261

[56] References Cited

U.S. PATENT DOCUMENTS

| | | | |
|---|---|---|---|
| 2,458,600 | 1/1949 | Imbert et al. | 60/262 |
| 3,118,276 | 1/1964 | Keenan et al. | 60/262 |
| 3,352,110 | 11/1967 | Cresswell | 60/262 |
| 3,368,352 | 2/1968 | Hewson | 60/262 |
| 3,449,914 | 6/1969 | Brown | 60/226 R |
| 3,468,473 | 9/1969 | Davies et al. | 60/226 R |
| 3,514,952 | 6/1970 | Schumacher et al. | 60/226 R |
| 3,797,233 | 3/1974 | Webb et al. | 60/226 R |
| 3,867,813 | 2/1975 | Leibach | 60/226 R |
| 3,886,737 | 6/1975 | Grieb | 60/226 R |
| 3,938,328 | 2/1976 | Klees | 60/262 |

*Primary Examiner*—Carlton R. Croyle
*Assistant Examiner*—Robert E. Garrett

*Attorney, Agent, or Firm*—James W. Johnson, Jr.; Derek P. Lawrence; Norman T. Musial

[57] ABSTRACT

A design technique, method, and apparatus for varying the bypass ratio and modulating the flow of a gas turbine engine of the bypass type in order to achieve improved mixed mission performance. The disclosed preferred embodiments each include a gas flow control system for management of core and bypass stream pressure comprising diverter valve means downstream of the core engine to selectively mix or separate the core and bypass exhaust streams. The flow control system may also include variable geometry means for maintaining the engine inlet airflow at a matched design level at all flight velocities. Each preferred embodiment thus may be converted from a high specific thrust mixed flow cycle at supersonic velocities to a lower specific thrust separated flow turbofan system at subsonic velocities with a high degree of flow variability in each mode of operation, wherein the engine inlet airflow may be maintained at a matched design level at all engine velocities. To further improve flow flexibility and assist in maintaining the engine inlet airflow matched to a design level throughout a variable velocity range, the flow control system may include a split fan in conjunction with two concentric bypass ducts. The disclosed variable cycle engine techniques, methods, and apparatus result in significantly reduced inlet and after-body drag levels and result in significantly improved installed fuel consumption for mixed mission aircraft.

11 Claims, 8 Drawing Figures

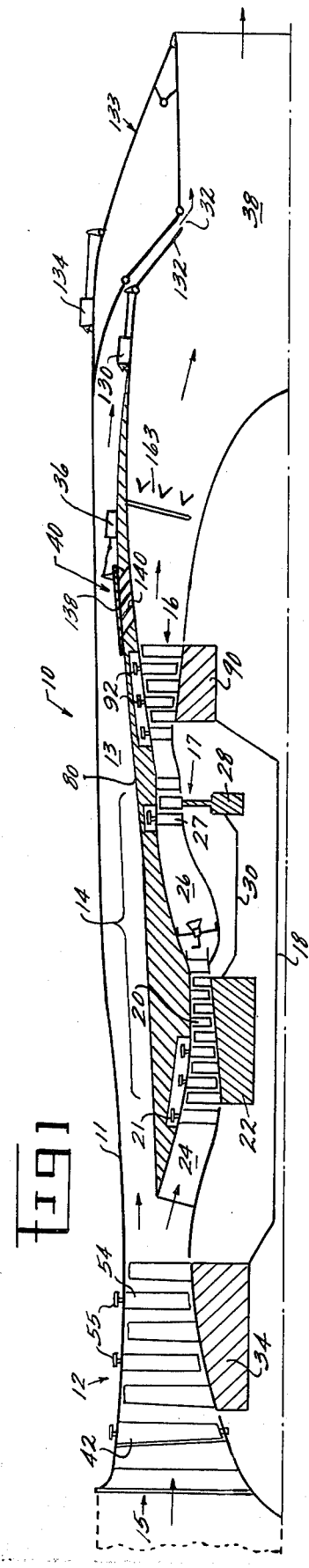
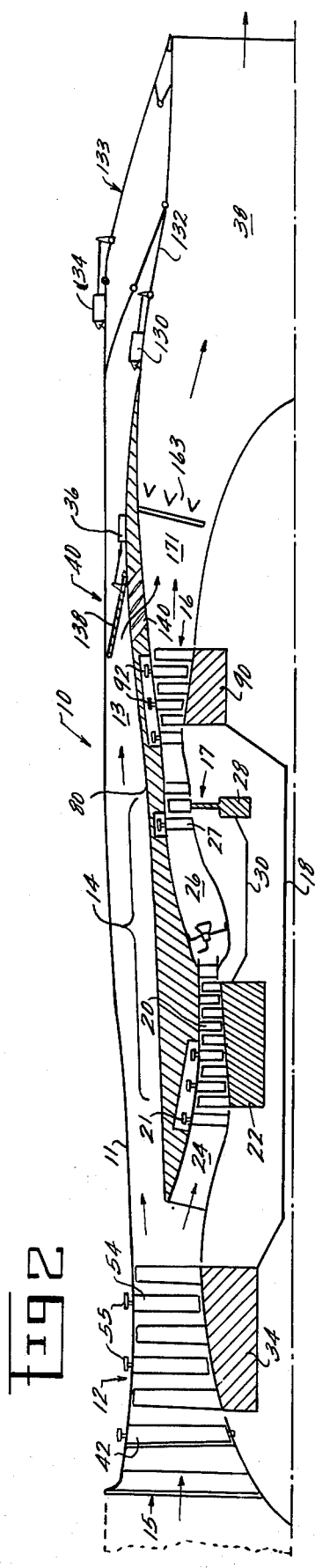
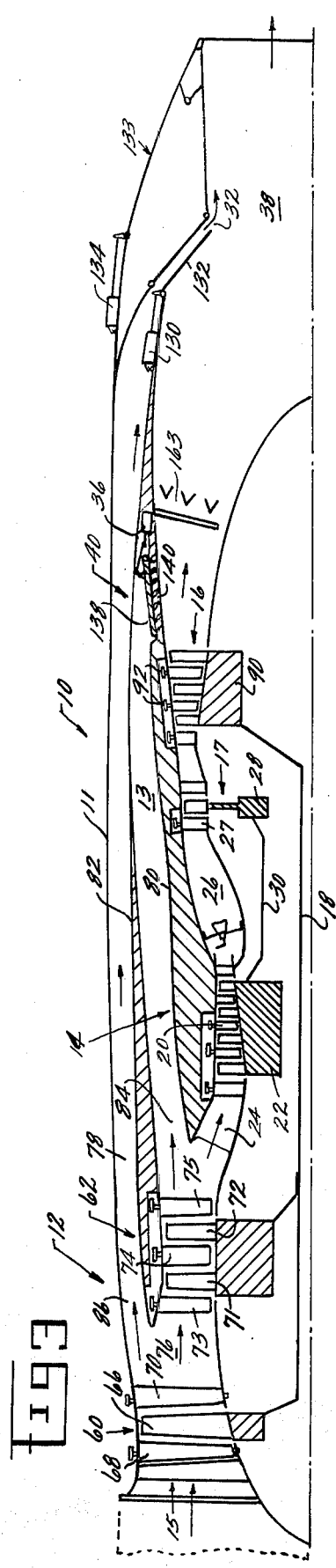

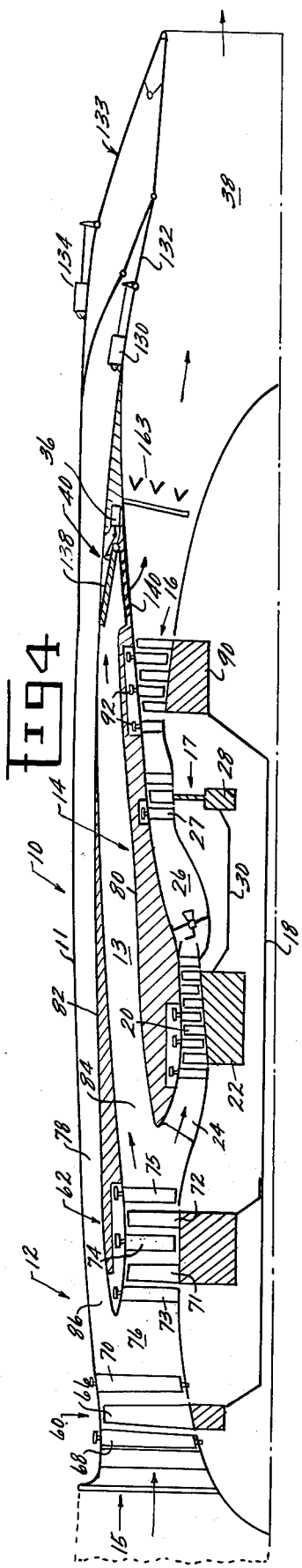
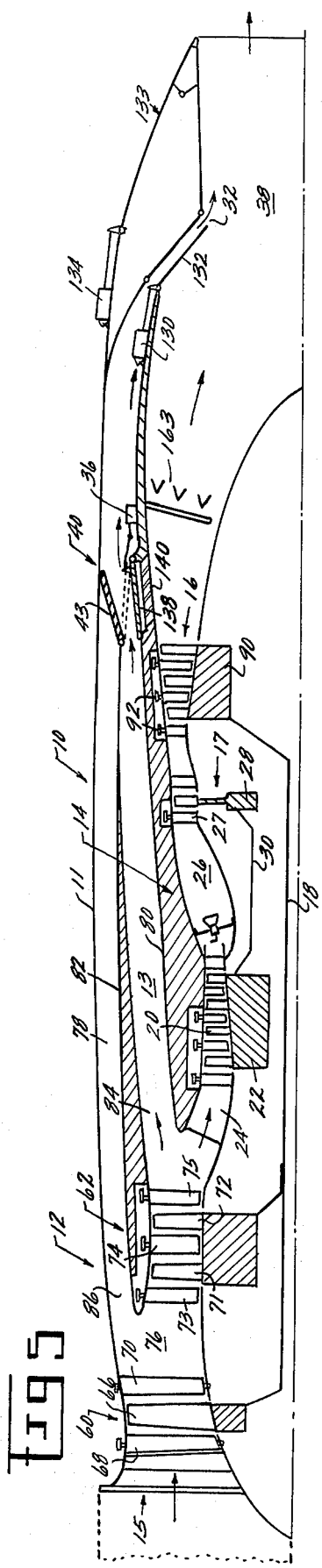
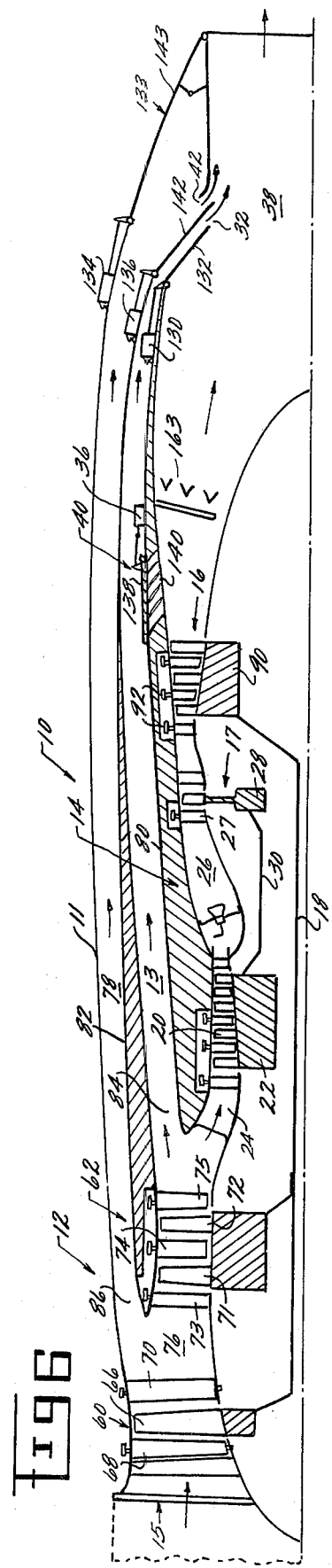

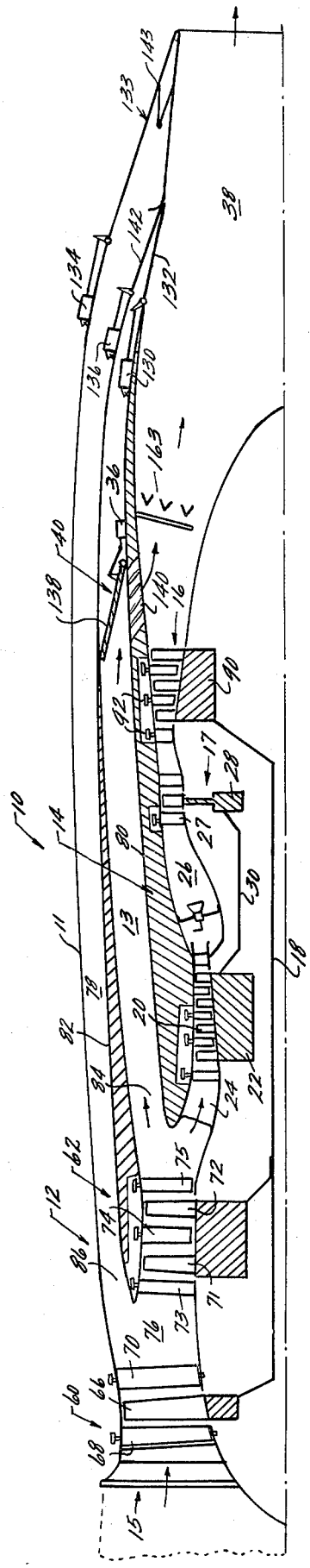
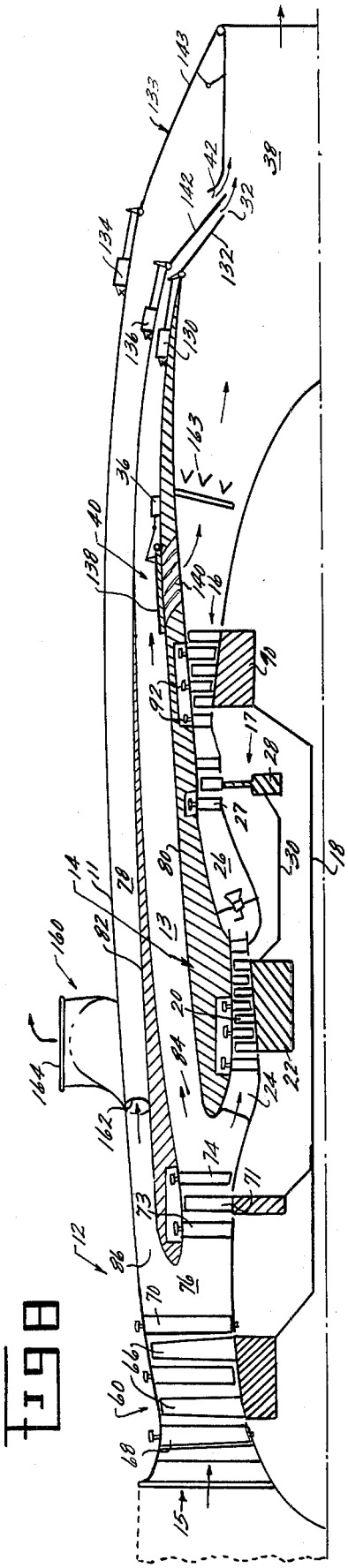

VARIABLE CYCLE GAS TURBINE ENGINES

The invention described herein was made in the performance of work under a NASA contract and is subject to the provisions of Section 305 of the National Aeronautics and Space Act of 1958, Public Law 85-568 (72 Stat. 435; USC 2457).

BACKGROUND OF THE INVENTION

The invention relates to a variable cycle gas turbine engine of the bypass type and, more particularly, to a variable cycle gas turbine engine suitable for powering a supersonic aircraft wherein the engine bypass ratio and gas flow may be controlled to satisfy particular engine operating conditions.

Considerable attention has been devoted to developing a gas turbine engine with the high specific thrust characteristics of a turbojet or low bypass turbofan at supersonic speeds which can also be configured to exhibit the lower specific thrust, low noise and low fuel consumption characteristic of a high bypass turbofan at subsonic speeds in order that a mixed mission aircraft may be developed.

To this end, modern aircraft designers have strived to develop the aircraft engine design criteria which would enable the development of a suitable mixed mission aircraft. Several design approaches to this problem have been offered. However, all such prior art approaches have failed to result in an engine with sufficient flow flexibility to enable efficient, stall free operation in all modes. Such prior art systems have included various concepts of retractable fans, variable area turbines, variable pitch fans, as well as more exotic and highly complex techniques such as those utilizing combinations of turbofan and turbojet engines in tandem or concentric flow relation. In addition to a lack of flow flexibility, these more exotic arrangements have the obvious disadvantage of being highly inefficient due to the dead weight associated with those engine components not used in all modes of flight.

More recent attempts at developing practical variable cycle engines include the selective direction of the inlet fan stream through alternative upstream fan ducts using inverter valves. While more effective than prior attempts at achieving satisfactory mixed mission performance, such systems have exhibited several negative characteristics. These include the addition of extra undesired length, weight and complexity to the engine.

Another such prior art system is disclosed in U.S. Pat. No. 3,635,029 issued to Claude Charles Felox Menioux on Jan. 18, 1972. In the Menioux system, a gas turbine engine of the duct barrier type is configured to operate as a ramjet or as a turbofan engine by means of a valve downstream of the core engine. One major disadvantage of this type is that the outer duct must be designed to accommodate extremely high temperatures since it must handle the high temperature core gas stream as well as the lower temperature bypass gas stream. In addition, the presence of the burners in the outer duct create still other high temperature problems in the design of the outer duct.

A further disadvantage of the gas turbine engine disclosed in the Menioux patent and other prior art variable cycle engines is that they fail to meet desired performance goals in all modes of operation because they have insufficient flow variability to maintain satisfactory engine performance in both supersonic and subsonic flight.

One of the reasons that prior art fixed cycle and variable cycle engines have not maintained satisfactory performance at both supersonic and subsonic speed is that the airflow to the inlet of such engines in not matched to the inlet airflow potential during all phases of flight. Typically in such engines the inlet is sized to be full at the maximum thrust of the engine. However, as engine thrust is decreased below the cruise thrust, typically by decreasing the bypass ratio, the engine airflow demand is considerably less than the total airflow supplied to the inlet. This excess of airflow causes inlet spillage drag which significantly increases the installed fuel consumption of prior art variable cycle engines.

OBJECT OF THE INVENTION

Therefore, it is a primary object of this invention to provide a flow control system for a gas turbine engine of the bypass type by which the engine may be configured to operate as a low bypass ratio, mixed flow, static pressure balanced turbojet or as a high bypass ratio separated flow turbofan.

It is a further object of this invention to provide a system to vary the bypass ratio and modulate the flow of a variable cycle gas turbine engine such that engine inlet airflow is matched to the design level as engine thrust is increased or reduced in order that the engine will operate efficiently throughout a variable velocity engine.

It is a further object of this invention to provide a variable cycle gas turbine engine which may be configured to operate at various velocities between subsonic and supersonic without any abrupt changes or discontinuities in engine airflow.

A further object of this invention is to provide a gas turbine engine having a system of diverter valves downstream of the core engine to selectively mix or separate the core and bypass exhaust streams in combination with variable geometry means to selectively vary the flow area and pressure of the core and bypass gas streams.

A further object of this invention is to provide a gas turbine engine which may include a split fan section and two concentric bypass ducts in conjunction with a system of diverter valves downstream of the core engine to selectively mix or separate the core and inner bypass exhaust streams.

It is also an object of this invention to provide a variable cycle engine that operates with a relatively larger total exhaust nozzle area than prior art variable cycle engines during subsonic flight to thereby reduce aft end drag and further improve installed specific fuel consumption.

A further object of this invention is to provide a variable cycle engine having a relatively large reserve turbine capacity in the separated flow mode of operation may be utilized to produce pressurized bypass air to be used for auxiliary purposes.

A still further object of this invention is to provide a variable cycle engine which can produce relatively large amounts of thrust in the separated flow mode of operation without the use of an afterburner.

SUMMARY OF THE INVENTION

These and other objects of the invention have been achieved in the preferred embodiments of the invention wherein a variable cycle gas turbine engine is provided with a fan, core engine comprising a compressor, combustor and high pressure turbine, all in serial flow connection; and at least one annular duct concentric to the core engine for bypassing a portion of the fan airflow around the core engine. The gas stream exhausted from the high pressure turbine is directed to a low pressure turbine which drives the fan through an upstream extending drive shaft. Separate bypass duct and core nozzles are provided to discharge the respective gas streams. A system of diverter valves is provided downstream of the core engine and low pressure turbine and upstream of the bypass and core nozzles to selectively mix or separate the core and bypass exhaust streams. In order to maintain flow flexibility and pressure variability, variable geometry means may be provided to vary the area of the core and bypass duct exhaust nozzles. In addition, the low pressure turbine may be provided with variable inlet guide vanes to assist in adjusting the low and high pressure turbine rotor speeds while allowing wide swings in low pressure turbine extraction rates during the separated flow mode of operation. The core engine compressor may be provided with sufficient variable stator geometry to permit stall free operation from engine start-up to full speed. Additional thrust may be provided by the use of an afterburner downstream of the core engine. To further increase the flow flexibility, the system may be modified by the use of a split fan section in conjunction with two concentric bypass ducts of the type described and claimed in U.S. Pat. application, Ser. No. 445,438, now abandoned filed by Bernard L. Koff et al on Feb. 25, 1974 and assigned to the same assignee as this invention. The bypass ducts may utilize a common variable area exhaust nozzle, or to further increase flow and pressure variability, each bypass duct may be provided with a separate variable area exhaust nozzle. In addition to improving flow flexibility the split fan embodiment permits the production of relatively high thrust for short term use in the separated flow mode of operation without the use of any afterburner. Further, the excess turbine capacity in the separated flow mode of operation may be used to provide large quantities of pressurized air to the airframe for lift enhancement or for other auxiliary purposes by providing a scroll separator in the outer bypass duct.

BRIEF DESCRIPTION OF THE DRAWINGS

The invention may be better understood upon reading the following description of the preferred embodiments in conjunction with the accompanying drawings wherein:

FIG. 1 is a cross-sectional view of a bypass gas turbine engine incorporating the variable cycle concepts of this invention in a high bypass mode of operation.

FIG. 2 is a cross-sectional view of the variable cycle engine of FIG. 1 in a low bypass mode of operation.

FIG. 3 is a cross-sectional view of a double bypass two stream exhaust gas turbine engine incorporating the variable cycle concepts of this invention in a high bypass mode of operation.

FIG. 4 is a cross-sectional view of the double bypass two stream exhaust gas turbine engine of FIG. 3 in a low bypass mode of operation.

FIG. 5 is a cross-sectional view of the double bypass two stream exhaust gas turbine engine of FIG. 3 in a high dry thrust separated flow mode of operation.

FIG. 6 is a cross-sectional view of a double bypass three stream exhaust gas turbine engine incorporating the variable cycle concepts of this invention in a high bypass mode of operation.

FIG. 7 is a cross-sectional view of the double bypass three stream exhaust gas turbine engine of FIG. 6 in a low bypass mode of operation.

FIG. 8 is a cross-sectional view of a double bypass variable cycle engine with a scroll separator in the outer duct and an alternate embodiment for the fan section.

DESCRIPTION OF THE PREFERRED EMBODIMENT

Referring to FIGS. 1 and 2 wherein like numbers refer to the same parts, there is shown a variable cycle gas turbine engine 10 having an outer casing or nacelle 11 spaced apart from an inner core engine 14 so as to define an annular bypass duct 13 therebetween. The variable cycle engine 10 includes a fan section 12 having a three-stage rotor 34 and inlet guide vanes 42 disposed between rotor stages and extending radially inward from the outer nacelle 11. The fan section 12 receives the inlet airflow from an inlet shown generally at 15, and thereupon pressurizes the airflow, a portion of which is delivered to the core engine 14 and the remainder of which is directed to bypass duct 13. The inlet 15 is sized to accept a predetermined design airflow. The core engine includes an axial flow compressor 20 having a rotor 22. Pressurized air entering the compressor 20 through a flow annulus 24 is compressed and then discharged to a combustor 26 where fuel is burned to provide high energy combustion gases which drive a high pressure turbine rotor 28. The high pressure turbine rotor 28 operates to extract kinetic energy from the high velocity core gas stream exiting the combustion chamber 26, and to convert this kinetic energy into torque for driving the rotor stages 22 of the compressor 20. For the purpose of providing additional control of the core engine flow, variable pitch inlet guide vanes 27 may be provided upstream of the turbine rotor 28.

Disposed downstream of the high pressure turbine 28, in a position to receive the flow of hot gases leaving the core turbine, is a low pressure turbine 16. The low pressure turbine 16 includes a rotor 90 and variable pitch inlet guide vane sections 92. While the rotor 90 has been illustrated as comprising three stages, it will be apparent to those skilled in the art that a smaller or greater number of stages may be utilized depending upon the turbine energy extraction potential required. The inlet guide vane sections 92 operate to convert kinetic energy from the core stream into torque and to deliver this torque to the rotor 90 which in turn drives the rotor 34 of fan section 12 through an upstream extending drive shaft 18 connected for rotation with rotors 34 and 90.

The cross-sectional flow area to the low pressure turbine rotor is varied by varying the pitch of the variable inlet guide vane sections 92 which acts to vary the back pressure on the high pressure turbine rotor and thereby control the high pressure turbine rotor speed. Propulsive force is obtained by the discharge of combustion gases from the core engine 14 through a variable area core nozzle 38. Propulsive force is also obtained by the action of the fan 12 discharging air through a variable area bypass nozzle 32 concentric to the core nozzle 38. In accordance with one aspect of the invention, in order to assist in modulating the flow in the bypass duct and core engine, the area of the bypass nozzle 32 and core nozzle 38 may be varied by suitable variable geometry means well known in the art such as described in U.S. Pat. No. 2,969,641. As illustrated, the variable geometry means may comprise a plurality of linear actuators 130 controlling hinged bypass nozzle flaps 132 and a second plurality of linear actuators 134 controlling a collapsible hinged wall assembly 133 to vary the cross-sectional area of the core nozzle 38 in the manner well known in the art. The hinged flaps 132 may be moved to a closed position, as best illustrated in FIG. 2, wherein the exhaust nozzle 32 is obtruded such as that no flow is exhausted therefrom.

Aft of the low pressure turbine 16 there is provided an annular diverter valve shown generally at 40. Valve 40 may comprise a hinged panel 138 under control of a linear actuator 36. The panel 138 covers a plurality of vanes 140 in the inner wall or nacelle 80 separating the bypass duct and core engine, and which are curved to promote mixing of the core and bypass gas streams. In its open position, as best illustrated in FIG. 2, the panel 138 uncovers the vanes 40 which permits the bypass flow to mix with the core stream. In its closed position, as best illustrated in FIG. 1, the panel 138 covers the vanes 40 to prevent mixing of the core and bypass gas streams.

In accordance with the invention, the diverter valve 40, in combination with the hinged flaps 132, are used to switch the basic engine mode of operation between a separated flow, high bypass, low thrust cycle, as shown in FIG. 1, to a mixed flow, low bypass, high thrust static pressure balanced cycle, as shown in FIG. 2.

In the high bypass mode of operation, the panel 138 is in its closed position, preventing mixing of the core and bypass exhaust streams and the hinged flaps 132 are in an open position, as illustrated in FIG. 1, providing a separate exhaust for the bypass duct air. This mode of operation eliminates the requirement to maintain a static pressure balance between the core and bypass streams and permits greater flexibility in varying engine thrust while also maintaining a matched engine inlet airflow. In this mode of operation the engine inlet airflow is maintained at the matched design level by adjusting the area of the core exhaust nozzle 38 and the bypass exhaust nozzle 32.

When it is desired to switch to a low bypass mode of operation, the diverter valve 40 is opened by moving the panel 138 to its open position to uncover the vanes 40 and the exhaust nozzle 32 is closed by moving the hinged flaps 132 to a closed position which blocks off the bypass exhaust and causes the flow through the bypass duct to flow through the vanes 40 and mix with the core stream as illustrated in FIG. 2. In the mixed flow mode of operation, a static pressure balance must be maintained in the region 171 at the confluence of the core and bypass gas streams. This static pressure balance is maintained while still keeping the engine inlet airflow at the matched design level by adjusting the areas of core nozzle 38 and by adjusting the other variable geometry components of the engine including variable inlet turbine guide vanes 27 and 92.

The diverter valve 40, as used herein, is operated in either a fully closed or a fully open position. For greater flow modulation it is also possible to operate the valve 40 as a variable area mixer. An arrangement of this type is disclosed in a copending U.S. patent application, Ser. No. 583,055, filed on June 2, 1975 by D. J. Rundell et al for "Variable Mixer Propulsion Cycle" and assigned to the same assignee as this invention.

Further flow flexibility may be achieved by providing a variable pitch mechanism for the inlet guide vane blades 21 of the compressor 20 so that they may operate as a valve to increase or decrease cross-sectional flow area to the compressor 20. To even further modulate the bypass ratio and maintain the inlet airflow matched to a design level during all modes of operation, the inlet guide vanes 54 of fan 12 may also include a variable pitch mechanism 55.

To provide additional thrust augmentation in the mixed flow mode of operation, an afterburner 163 may be provided downstream of the passageway 140.

The flexibility provided by the variable geometry and variable cycle characteristic of the invention permit selection of core temperature, bypass and pressure ratio for optimum performance at an airflow which is matched to inlet size and flight conditions to provide efficient operation during all modes of flight. The limit to matched inlet airflow thrust modulation in the embodiment illustrated in FIGS. 1 and 2 is encountered when the low pressure turbine 16 reaches its maximum energy extraction potential. To further improve part throttle high bypass performance, a modification of the basic single bypass engine of FIGS. 1 and 2 is required. One such modification is illustrated in the embodiment of FIGS. 3 and 4.

Referring now to FIGS. 3 and 4, where like numbers refer to previously identified components, there is shown an alternate embodiment of a gas turbine engine illustrating the principles of the present invention and which provides improved flow flexibility over the embodiment of FIGS. 1 and 2. In this embodiment, the fan section 12 of the engine is divided into two sections, a front fan section 60 and an aft fan section 62. Front fan section 60 includes a first rotatable fan rotor stage 66 disposed between inlet guide vanes 68 and 70. The aft fan section 62 downstream of the front fan section 60 includes a fan rotor having two stages of rotor blades 71 and 72, with associated inlet guide vanes 73, 74 and 75 disposed between alternate rotor blades 71 and 72. Although the front fan section 60 has been illustrated as comprising a single rotor section 66, and aft fan section 62 has been illustrated as comprising a double rotor section 71 and 72, additional rotor sections may be added to each fan section, and/or the ratio of front fan sections to aft fan sections may be altered to any desired configuration. For example, as illustrated in FIG. 8, the front fan section may utilize two rotor stages, while the aft fan section utilizes a single rotor stage. The fan stages 60 and 62 are axially displaced from one another by an axial space designated generally at 76. In the present embodiment, each of the fan stator stages incorporates a variable pitch characteristic. The pitch variation of the stator 68 and 70 of the front fan section 73, 74 and 75 of the aft fan section operate as a valve to define the cross-sectional area of the engine which is open to airflow at the respective planes thereof and assist in determining the quantity of air drawn through each respective fan stage in a single revolution during operation thereof so as to maximize the flexibility in adjusting the bypass and pressure ratio of the variable cycle engine of this invention while maintaining the inlet airflow matched to the design level throughout varying modes of operation. In addition to an inner bypass duct 13, as illustrated in FIGS. 1 and 2, the embodiment of this invention includes an outer bypass duct 78. The inner bypass duct 13 is defined between the core engine nacelle 80 and an intermediate nacelle 82. The inlet 84 to the inner bypass duct is disposed downstream of the aft fan stage 62. As a result, airflow directed through duct 13 will have been compressed by fan stages 60 and 62. The outer bypass duct 78 is defined between the intermediate nacelle 82 and the outer nacelle 11, and is disposed concentric to the radial exterior of the innermost bypass duct 13. The outer bypass duct 78 has an inlet 86 disposed within the axial space 76 between the front and aft fan stages. Due to this arrangement, air directed through inlet 86 and outer bypass duct 78 will have been compressed only by the front fan 60.

Also downstream of the aft fan stage 62, and generally coplanar with inlet 84, is the inlet 24 to the core engine compressor 20. The compressed gases exiting from the core engine compressor 20 are discharged into an annular combustor 26 where the fuel is burned to provide high energy combustion gases which drive the high pressure turbine 28 and the low pressure turbine 16 through an upstream extending driveshaft 30 in the manner of the embodiment of FIGS. 1 and 2.

The low pressure turbine 16 supplies rotational energy to the front and aft fan sections 60 and 62 through upstream extending driveshaft 18 connected to low pressure turbine rotors 90 and the fan rotors 66, 71 and 72. The fan driveshaft 18 is rotatably independent of the compressor driveshaft 30 such that these two shafts may be independently controlled in their respective velocities of rotation. Velocity control of the high pessure turbine rotor is partially accomplished by means of variations of the pitch of variable inlet guide vanes 92 of the low pressure turbine and the area of the core nozzle 38. Velocity control of the low pressure turbine rotor is partially controlled by adjusting the bypass duct exhaust areas using the variable area bypass duct nozzle 32 and by adjusting the core exhaust area using the variable area core nozzle 38.

Although rotor 66 of the front fan section 60 and rotors 71 and 72 of the aft fan section 62 maintain the same rotational speed by virtue of their connection to the same rotor shaft 18, the airflow between these two fan sections is not identical by virtue of a separately controlled variable pitch mechanism for each respective fan section. Thus, front fan section 60 may be low or high-flowed through the use of variable inlet guide vanes 66 and 68 while the aft fan section 62 may be low or high-flowed by utilization of variable pitch inlet guide vanes 73, 74 and 75. While rotor 66 of front fan section 60 and rotors 71 and 72 of aft fan section 62 have been shown as connected to the same driveshaft 18, it is also possible, with a great deal more complexity, to utilize separate driveshafts for each of these rotor sections. In such an embodiment, not here illustrated, a second low pressure turbine may be provided with its own separate upstream extending driveshaft to drive the front fan section. An arrangement of this type is disclosed in U.S. Pat. application Ser. No. 445,438, filed Feb. 25, 1974, and assigned to the same assignee as this invention.

Aft of the low pressure turbine 16, there is provided an annular diverter valve 40 in the manner of the embodiment of FIGS. 1 and 2. Annular diverter valve 40 in its open position, as illustrated in FIG. 4, permits the flow in the inner bypass duct 13 to mix with the core engine exhaust and in its closed position, as illustrated in FIG. 3, obtrudes the flow in the inner bypass duct 13. Annular diverter valve 40 and the variable bypass nozzle 32 operate in conjunction to change the engine mode of operation from high bypass separated flow to low bypass mixed flow. In the high bypass separated flow mode of operation, as illustrated in FIG. 3, the annular diverter valve 40 is closed to obtrude inner duct flow and the bypass nozzle 32 is moved to an open position such that the flow through the outer bypass duct is exhausted through the bypass nozzle 32 and there is no flow in the inner bypass duct 13. Configured in this manner, the engine operates as a high bypass separated flow turbofan. When it is desired to switch to a low bypass mode of operation, the bypass nozzle 32 is closed to obtrude the flow in the outer bypass duct and the diverter valve 40 is opened to permit mixing of the inner bypass duct and core streams as best illustrated in FIG. 4. In this mode of operation a static pressure balance must be maintained at the confluence of the inner bypass and core streams. This embodiment may also operate in a high bypass mixed flow mode, not shown, by simultaneously opening the diverter valve 40 and the bypass nozzle 32.

A static pressure balance is maintained at the confluence of the inner bypass duct and core exhaust streams by adjusting the area of the core exhaust nozzle 38 and by modulating the core and bypass flows utilizing the other variable geometry components of the engine including the variable inlet guide vanes 66, 68, 73, 74, 75, 21, 27, and 92.

The double bypass embodiment of this invention also offers the potential for the production of a significantly high level of thrust in a separated flow mode of operation without the use of an afterburner. This high "dry" thrust is achieved as illustrated in FIG. 5 by providing a second diverter valve 43 rotatably hinged to the downstream end of the intermediate nacelle 82. The annular hinged valve 43 is moved by a suitable actuator, not shown between a closed position as illustrated in FIG. 5, wherein the flow in the outer bypass duct 78 is obtruded and the inner bypass duct 13 is placed in flow communication with the bypass nozzle 32, to an open position, illustrated in phantom in FIG. 5 wherein the flow in the outer bypass duct is exhausted from the bypass nozzle 32 and the flow in the inner bypass duct 13 is obtruded. In the high dry thrust mode of operation, as illustrated in FIG. 5, there is no outer duct flow and the total inner duct flow is exhausted through the bypass nozzle 32. By adjusting the low pressure turbine guide vanes 92, core speed and temperature can be increased to produce relatively high thrust levels while maintaining the low pressure rotor speed and flow constant.

The dual fan sections of this embodiment permit a greater amount of matched inlet airflow thrust modulation in the high bypass mode than is possible with the single bypass duct embodiment of FIGS. 1 and 2. By virtue of the presence of fan ducts 13 and 78, having their inlets 86 and 84 respectively disposed as described above, a predetermined quantity of airflow entering inlet 15 may be divided between and routed through the outer bypass duct 78 and the aft fan section 62. The air entering the aft fan section 62 is further compressed and then divided between and routed through the inner bypass duct 13 and the core compressor 20. By control of the variable inlet guide vanes 58 and 66 of the front fan sections 73, 74 and 75 of the aft fan section 62 and the variable pitch mechanism 21 of the inlet guide vanes of the compressor 20, and by control of the respective areas of bypass nozzle 32 and core nozzle 38, the total inlet airflow may be divided between the outer bypass duct 78, the inner bypass duct 13, and the core compressor 20 in varying proportions so that the bypass ratio may be varied over a wide range while maintaining the total engine inlet airflow at the matched design level. More particularly, increasing the proportion of total airflow which is directed to the fan bypass ducts 13 and 78, while reducing flow through the core engine 22, results in a higher bypass ratio, while decreasing the proportion of total airflow through the bypass ducts 78 and 13, while increasing the airflow through the core engine 22 results in a lower bypass ratio.

The disposition of the inlet 84 to inner duct 13 and the inlet 24 to the core compressor 20 downstream of the inlet to outer duct 78 and the inlet to the aft fan section 62 combine with the variable geometry of the front fan section 60, the aft fan section 62, the core compressor 20, the high pressure turbine 28, and the low pressure turbine 16 to provide a high degree of flow modulation with matched inlet airflow in the high bypass mode of operation without exceeding the energy extraction potential of the low pressure turbine 16.

In order to further increase the flow and pressure variability of the double bypass variable cycle engine, a modification of the engine of FIGS. 3, 4, and 5 is required. Referring to FIGS. 6 and 7, wherein like numbers refer to previously identified components, therein is shown a cross-sectional view of an alternate embodiment for the double bypass variable cycle engine in which a separate variable area exhaust nozzle 42 for the outer duct 78 is provided.

In this embodiment, the intermediate nacelle 82 is extended downstream to terminate in a plane approximately coplanar the downstream end of the inner nacelle 80. Each of the bypass ducts 13 and 78 is provided with a suitable variable area exhaust nozzle 32 and 42 respectively. A hinged flap or valve 132 controlled by a suitable linear actuator 130 is provided to vary the area of the bypass nozzle 32 and obtrude the inner bypass duct 13 in the mixed flow mode of operation in the manner of the embodiments of FIGS. 1 and 2. A second hinged flap or valve 142 is secured to the downstream end of the intermediate nacelle 82 and is controlled by suitable linear actuator means 136 to vary the area of the outer duct nozzle 42 and obtrude the outer bypass duct 78 when in a mixed flow mode of operation. The variable area core nozzle 38 and the diverter valve 40 of this embodiment are the same as that of the embodiments of FIGS. 1 and 2.

The ability to separate the exhaust and individually vary the area of both bypass ducts 13 and 78 permits even greater flexibility adjusting low pressure turbine rotor speeds and high pressure turbine rotor speeds in order to achieve a desired bypass ratio at matched inlet airflow for the variable cycle engine of this invention. In operation, in the mixed flow mode of operation, as illustrated in FIG. 7, both bypass duct exhaust nozzles 32 and 42 are closed and the diverter valve 40 is opened, such that there is no flow through the outer bypass duct 78, and the flow through the inner bypass duct 13 is mixed with the core flow in the same manner as the embodiment of FIG. 2. In the separated flow mode of operation, as illustrated in FIG. 8, both bypass duct nozzles 32 and 42 remain open and the diverter valve 40 is closed to prevent mixing of the core and bypass exhaust streams. Because the flow in the inner bypass duct 13 is separated from the core engine flow there is no requirement to maintain a static pressure balance at the confluence of these two streams, thereby permitting greater flexibility in varying the engine bypass and pressure ratio.

The ability to modulate the flow through the bypass duct and core engine over a wide range of rotor speeds, together with the ability to switch the exhaust from the bypass ducts and core engine from a separated flow to a mixed flow mode of operation by use of the diverter valve 40 enables the variable cycle engine of this embodiment to operate either as a high bypass turbofan or as a low bypass turbojet and further permits total inlet airflow to be maintained at a minimum spillage level during both modes of operation as well as during all transitional points between these two modes of operation.

Because the nozzle area in the separated flow mode of operation is relatively large (equal to the sum of the core nozzle area and the bypass nozzle areas), the variable cycle engine of this invention exhibits a significantly lower afterbody drag level than is present in prior art variable cycle engines which do not utilize a separate exhaust system for the bypass gas stream. This reduced afterbody drag results in significantly improved installed fuel consumption for the variable cycle engine of this invention.

The embodiment of FIGS. 6 and 7 may also be configured to operate in a high dry thrust mode. Thus, by closing the outer bypass duct nozzle 42 and diverter valve 40 while simultaneously opening the inner bypass duct nozzle 32 the flow in the outer duct 78 is obtruded and the total inner duct flow is exhausted through the inner bypass duct nozzle 32 in the manner of the embodiment of FIG. 5.

The double bypass 3 hole nozzle embodiment of the variable cycle engine of this invention exhibits a relatively high reserve turbine capacity in the separated flow mode of operation which may be utilized for auxiliary purposes. It is a widely accepted practice in aircraft engine design to utilize a portion of the compressed engine airflow for purposes other than to produce a propulsive force. These purposes include providing a source of cooling air for the engine components, as well as providing air to the airframe. As the complexity of modern aircraft design has increased, so has the need for such auxiliary air increased. For example, in order to provide lift enhancement to an aircraft, it has been proposed that a portion of the bypass duct flow be directed to flow over, to or around the aircraft wings and/or flaps. In conventional engine designs only a limited amount of such air may be directed for such purposes, since excessive bleeding of pressurized air causes an undesired decay in the delivered thrust of the engine. A possible solution to minimizing engine thrust decay due to bleed is to increase total engine airflow beyond that required to deliver a desired thrust for a given operating condition. The variable cycle engine of this invention in the split fan embodiment can provide such an increase in engine airflow without exceeding turbine temperature limitations and energy extraction potentials. During periods of high auxiliary bleed requirements, the engine front fan may be high flowed by adjusting the variable inlet guide vanes and the excess front fan flow may be scrolled off into a super circulation ducting system or utilized for other auxiliary purposes. FIG. 8 shows an arrangement of a double bypass variable cycle engine in which a scroll separator, shown generally at 160, comprising a plenum 162 and scroll 164, is mounted in flow communication with the outer bypass duct 78. The plenum 162 collects auxiliary air from the outer bypass duct 78 and directs that air through scroll 164 to the desired aircraft components — for example, over the wings, to produce lift augmentation to the airframe. The ratio of the number of rotor blades in the front fan section 60 to the number of rotor blades in the rear fan section 62 in this embodiment has been reversed from that of the embodiments of FIGS. 3 through 7 in order to increase the pressure level in the outer duct 78. Because of the larger flow flexibility and excess turbine capacity in the separated flow mode of operation of the variable cycle engine of this invention, relatively large amounts of highly compressed air may be bled from the outer bypass duct with a minimal loss in overall engine thrust.

Various changes could be made in the structure shown in FIGS. 1 through 8 without departing from the scope of the invention. For simplicity in design, the number of variable geometry components utilized has been kept to the minimum necessary to achieve the desired degree of flow variability; however, it is also possible to utilize other variable geometry components such as variable pitch rotor blades for the fan and turbine sections in order to achieve additional flexibility in flow modulation without departing from the scope of the invention.

Therefore, having described preferred embodiments of the invention, though not exhaustive of all possible equivalents, what is desired to be secured by Letters Patent of the United States is claimed below.

What is claimed is:

1. A gas turbine engine comprising:
   an inner nacelle circumscribing a core engine, low pressure turbine and afterburner in respective serial flow relation wherein the inner nacelle extends downstream of the afterburner to define an inner nozzle for exhausting the core engine gas flow;
   an outer nacelle circumscribing the inner nacelle and spaced apart therefrom to form an outer bypass duct around the core engine and wherein the outer nacelle extends upstream of the inner nacelle to form an inlet for the engine and downstream of the inner nozzle to form an outer nozzle for exhausting the bypass and core engine gas flows;
   a fan disposed in the inlet upstream of the core engine and driven by the low pressure turbine for compressing inlet gas flow to the bypass duct and core engine;
   flow passage means disposed through the inner nacelle intermediate the low pressure turbine and afterburner for injecting the bypass duct flow into the core engine exhaust such that the combined flows are directed through the afterburner;
   valve means for selectively obtruding and unobtruding the flow passage means whereby the engine may be operated as a high bypass turbofan when said flow passage means is obtruded and as low bypass mixed flow augmented turbojet when said flow passage means is unobtruded, and
   flap means pivotally hinged to the downstream end of the inner nacelle for simultaneously varying the area of the inner exhaust nozzle and the exhaust area of the other bypass duct, wherein the flap means is movable to a position to abut the outer nacelle such that gas flow through the outer bypass duct is obtruded.

2. The gas turbine engine of claim 1 further comprising means for varying the area of the outer exhaust nozzle.

3. The gas turbine engine of claim 1 further comprising variable geometry means for maintaining the inlet airflow matched to an optimum design level as the bypass ratio is varied.

4. The gas turbine engine of claim 3 further comprising:
   an intermediate nacelle circumscribing the inner nacelle and circumscribed by the outer nacelle to form an inner bypass duct between the core engine and outer bypass, having its upstream end disposed between the fan and the upstream end of the inner nacelle whereby gas flow compressed by the fan is divided between the outer bypass duct, inner bypass duct and core engine.

5. The gas turbine engine of claim 4 further comprising an aft fan disposed upstream of the inner nacelle and circumscribed by the intermediate nacelle whereby gas flow compressed by the aft fan is divided between the inner bypass duct and core engine.

6. The gas turbine engine of claim 5 wherein the downstream end of the intermediate nacelle terminates in abutting relationship to the inner nacelle at a point downstream of said flow passage means whereby all flow through the outer bypass duct is exhausted from the outer nozzle when said outer nozzle is unobtruded by the flap means and all flow through said inner bypass duct is directed through the flow passage means when the flow passage means is unobtruded.

7. The gas turbine engine of claim 5 wherein the downstream end of the intermediate nacelle terminates upstream of the downstream end of the inner nacelle and includes second flap means pivotally hinged thereto said second flap means movable between a first position wherein the flap means abuts the outer nacelle to thereby obtrude flow through the outer bypass duct and place the inner bypass duct in flow communication with the outer nozzle, and a second position wherein the second flap abuts the inner nacelle downstream of the flow passage means such that flow through the outer duct is exhausted through the outer nozzle, and flow through the inner duct downstream of the flow passage means is obtruded whereby the gas turbine engine may be operated in a mode for the development of high thrust without the use of the afterburner wherein the second flap means is placed in abutting position with the outer nacelle and the valve means is placed in position to obtrude flow through the flow passage means.

8. The gas turbine engine of claim 5 wherein the downstream end of the intermediate nacelle terminates intermediate the respective downstream ends of the inner and outer nacelles and includes third flap means pivotally hinged thereto to form an intermediate variable area exhaust nozzle whereby the core engine flow is exhausted from said inner nozzle, the inner bypass duct flow is exhausted from the intermediate nozzle and the combined core engine, inner bypass duct and outer bypass duct flow streams are exhausted from the outer nozzle.

9. The gas turbine engine of claim 8 further comprising:
   auxiliary passage means in flow communication with the outer bypass duct for supplying pressurized bypass duct air to be utilized for auxiliary purposes.

10. The gas turbine engine of claim 8 wherein the auxiliary passage means comprises a plenum and scroll.

11. The gas turbine engine of claim 3 wherein the core engine comprises a compressor, combustor and high pressure turbine in respective serial flow relation and wherein the variable geometry means comprises a variable inlet guide vane intermediate the high and low pressure turbines.

* * * * *